(No Model.)
A. MILLER.
RECLEANER FOR GRAIN AND SEED SEPARATORS.
No. 322,465. Patented July 21, 1885.
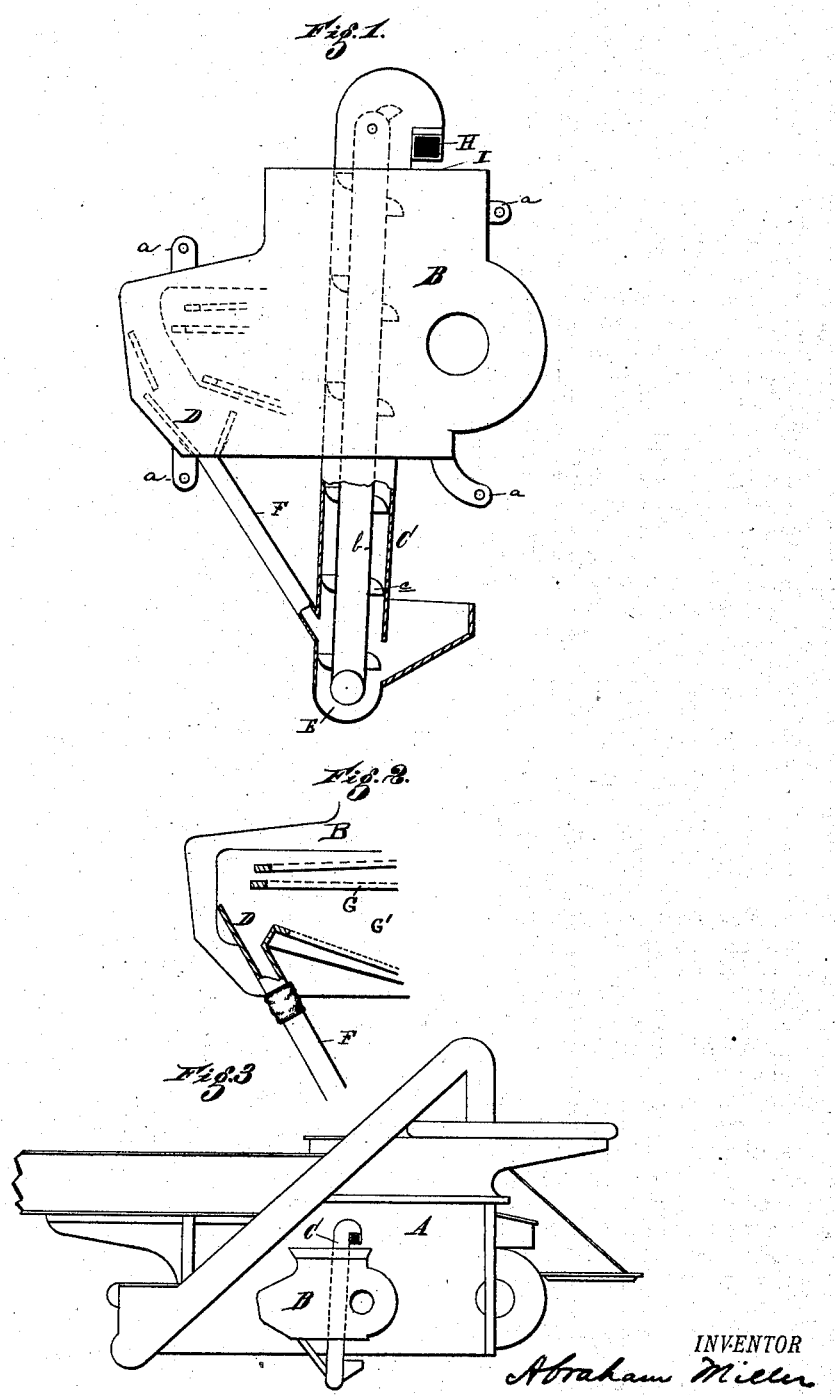

UNITED STATES PATENT OFFICE.

ABRAHAM MILLER, OF NEWARK, OHIO, ASSIGNOR TO THE NEWARK MACHINE COMPANY, OF SAME PLACE.

RECLEANER FOR GRAIN AND SEED SEPARATORS.

SPECIFICATION forming part of Letters Patent No. 322,465, dated July 21, 1885.

Application filed May 15, 1884. (No model.)

*To all whom it may concern:*

Be it known that I, ABRAHAM MILLER, of Newark, county of Licking, State of Ohio, have invented a new and useful Improvement in Recleaners for Grain and Seed Separators; and I declare the following to be a full, clear, and exact description of the same, such as will enable others skilled in the art to which it pertains to make and use it, reference being had to the accompaning drawings, which form a part of this specification.

My invention relates to an improvement in grain or seed recleaning attachments for grain or seed separators and hulling or thrashing machines, the object of the same being to provide devices for automatically returning the tailings to the hopper of the recleaner as rapidly as the same may pass from the shoe; and with this end in view my invention consists in the parts and combinations of parts as will be more fully described, and pointed out in the claims.

In the accompanying drawings, Figure 1 is a view in side elevation partly in section of my attachment. Fig. 2 is a view in vertical section of a modified form of device; and Fig. 3 is a view in side elevation, showing the attachment applied to a clover hulling or thrashing machine.

A represents an ordinary separator or clover hulling or thrashing machine, and B the frame of the attachment, provided with lugs $a$, by means of which it is secured to the huller or separator.

At one side of the frame of the attachment is arranged an elevator, C, composed of an endless band, belt, or chain, $b$, carrying buckets, $c$, which latter take up the tailings in the receptacle E at the lower end of the elevator frame-work, which tailings are received into said receptacle through the inclined conducting-spout F, which connects with said receptacle E at its lower end, and at its upper end with the recleaner, below the screens G of the shoe G'.

The upper end of the elevator-frame is provided with a discharge-spout, H, which overhangs the hopper I of the recleaner, to deliver the tailings thereto, which, as before stated, are elevated by the buckets on the endless belt.

The spout F is so located as to permit the tailings that pass over the shoe of the recleaner to drop into the spout, which directs the same back into the elevator C, whereby it is returned to the hopper of the recleaning device and passed again over its shoe, thereby doing away with the necessity of rehandling the said tailings. The spout may, if desired, be attached to the shoe itself, so as to be agitated with the shoe, and thus assist to shake the tailings down into the elevator, as shown in Fig. 2.

Having fully described my invention, what I claim as new, and desire to secure by Letters Patent, is—

1. A recleaning attachment for grain separators, consisting, essentially, of a hopper, a screen for receiving the grain from the hopper, an elevator having a chamber at its lower end, and its upper end arranged to deliver the grain to the hopper, and an inclined conductor having one end connected directly with the chamber of the elevator and its upper end formed into a mouth arranged under the discharge-mouth of the screen to convey the tailings to the chamber of the elevator, substantially as set forth.

2. The combination, with a separator, of a recleaning device, consisting, essentially, of a screen, an elevator for elevating the tailings to the screen, and a spout arranged directly between the screen and elevator for receiving the tailings from the screen and discharging them into the elevator frame or casing.

In testimony whereof I sign this specification in the presence of two witnesses.

ABRAHAM MILLER.

Witnesses:
J. M. COBURN,
W. P. MILLER.